United States Patent [19]

Groschupp

[11] 4,378,172
[45] Mar. 29, 1983

[54] TELESCOPICALLY ADJUSTABLE SUPPORT PARTICULARLY FOR A CAMERA TRIPOD

[75] Inventor: Dieter Groschupp, Langenzenn, Fed. Rep. of Germany

[73] Assignee: Cullmann Handelsgesellschaft für Verbrauchsgüter mbH, Langenzenn, Fed. Rep. of Germany

[21] Appl. No.: 195,260

[22] Filed: Oct. 8, 1980

[30] Foreign Application Priority Data

Oct. 13, 1979 [DE] Fed. Rep. of Germany ....... 2941537

[51] Int. Cl.³ .............................................. F16B 7/14
[52] U.S. Cl. .................................... 403/104; 248/411
[58] Field of Search ................ 403/104, 109; 248/411, 248/412, 188.5

[56] References Cited

U.S. PATENT DOCUMENTS 2,184,358 12/1939 Moore .............................. 403/109 X

FOREIGN PATENT DOCUMENTS 2510962  9/1976  Fed. Rep. of Germany ...... 403/109
2617313 10/1976  Fed. Rep. of Germany ...... 403/109

*Primary Examiner*—Andrew V. Kundrat
*Attorney, Agent, or Firm*—Staas & Halsey

[57] ABSTRACT

In a telescopically adjustable support, an axially divided elastic sleeve extends over outer and inner tubes and has projections engaging the inner tube through apertures in the outer tube. The sleeve can be tightened to the inner tube by a coupling nut. The radial length of the projections is larger than the radial spacing between the external tube faces so that additional clamping is brought about by the sleeve at a spacing from the sleeve end adjacent the inner tube, whereby clamping is effected at two spaced and separated areas to achieve a particularly rigid connection of the tubes.

6 Claims, 8 Drawing Figures

U.S. Patent   Mar. 29, 1983   4,378,172
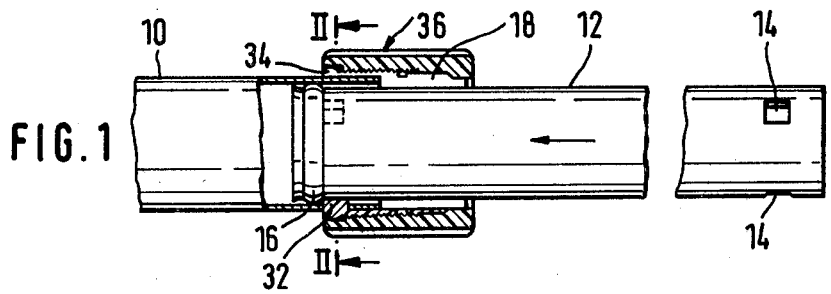
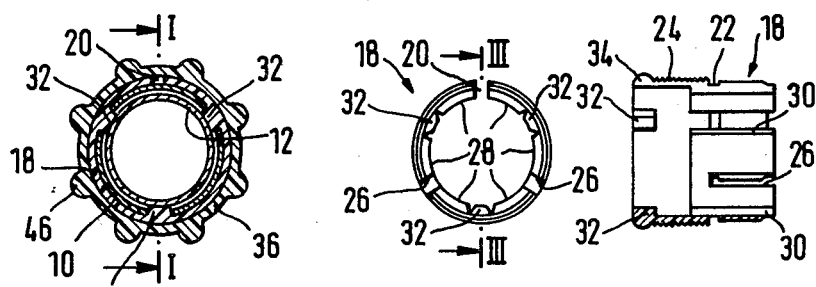
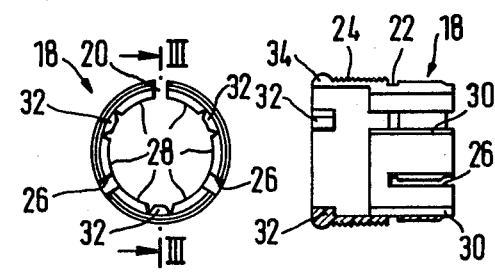
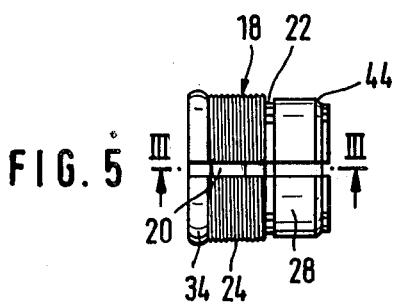
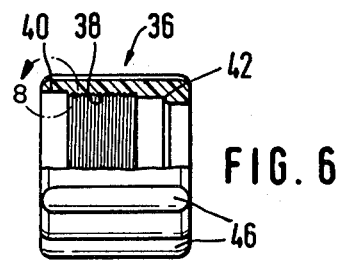
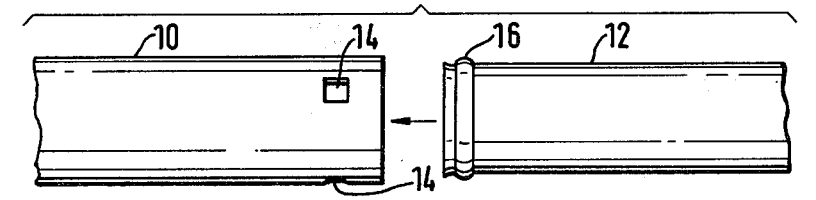

TELESCOPICALLY ADJUSTABLE SUPPORT PARTICULARLY FOR A CAMERA TRIPOD

BACKGROUND OF THE INVENTION

1. Field of the Invention

The invention relates to a telescopically adjustable support, particularly for a camera tripod, comprising at least two telescopically engageable tubes of which the outer tube has circumferentially disposed apertures at the push-on end engaging over the inner tube, axially divided elastic locking means which are provided on the push-on end of the outer tube, extend over the zone of engagement of the inner and outer tubes to surround same and have projections engaging through the apertures of the outer tube as well as clamping means engaging the inner tube beyond the outer tube, and fixing means co-operating with the locking means and acting on the clamping means thereof.

2. Description of the Invention

A telescopically adjustable support of the kind referred to is known for example from DE-OS No. 2 617 313. In the known support, the locking means comprise two separate parts, namely an externally screwthreaded sleeve to be placed over the push-on end of the outer tube and a locking sleeve or clamping ring, both parts containing an axially throughgoing slit to facilitate placement over the tubes. The clamping ring is provided with annular oblique faces at both ends, one of these engaging between the outer and inner tubes and the other co-operating with a complementary oblique face on the inner periphery of a nut which can be screwed onto the sleeve and constitutes the fixing means.

In this arrangement, for which the tubes, the sleeve, the clamping ring and the nut must of course all be round, use is made of an axial clamping motion in order to fix the inner tube to the outer tube at whatever distance it has been inserted therein, the inner tube being guided and clamped tight by the relatively close oblique faces at the two ends of the clamping ring.

The projections which are provided on the sleeve and engage through apertures in the outer tube are radially shorter than the spacing between the external faces of the outer and inner tubes and they merely serve as an abutment for an annular shoulder provided on the push-in end of the inner tube, whereby to prevent complete withdrawal of the inner tube from the outer tube when the fixing nut is untightened.

In the known telescopically adjustable support, it is a disadvantage that the locking means consist of two separate parts which call for two different manufacturing apparatuses, complicate assembly and therefore give rise to higher production costs than for locking means made in one piece. Further, since the clamping ring should not exceed a certain length, the retention of the inner tube brought about by it is not as secure as may often be desired. A camera tripod utilizing such supports is insufficiently stable. Finally, it should be repeated that only round profiles are feasible because of the axial clamping motion.

SUMMARY OF THE INVENTION

It is the object of the present invention to improve the aforementioned telescopically adjustable support and in particular so that the locking means are simplified while at the same time the inner tube is more securely held in the outer tube so as to increase the stiffness of the connection between the two tubes.

According to the invention, the locking means comprise a single one-piece locking sleeve having projections that engage through the apertures in the outer tube and also having clamping means. Furthermore, for the purpose of additionally clamping of the inner tube by the projections on the sleeve, the radial length of the projections engaging the inner sleeve through the apertures in the outer tube is larger than the radial spacing between the external surfaces of the inner and outer tubes.

In contrast with the known telescopically adjustable support, therefore, the locking means of the support according to the present invention consist of a single part whereby to simplify production and assembly. In addition, the inner tube is more securely held in the outer tube in that the inner tube is not only clamped tight over the length of the clamping means but also by the projections which are remote from the clamping means and engage through the apertures in the outer tube, so that the length over which the inner tube is held is considerably larger than in the case of the known support.

Further, since there is no clamping ring which has to be partially inserted between the outer and inner tubes and necessitates an axial clamping motion, a preferred embodiment of the invention may employ fixing means in the form of a toggle clamp which only exerts radial forces on the locking sleeve. Consequently, the construction of the invention is also applicable to non-circular tube sections.

To improve or simplify clamping of the inner tube still further, another embodiment of the invention provides for the section of the locking sleeve surrounding the inner tube beyond the outer tube to comprise a plurality of clamping jaws formed by axial slits at several positions.

Instead of a toggle clamp, however, the arrangement can be similar to the known support in that the part of the locking means having the projections and enveloping the outer tube is provided with an external screwthread and the fixing means are in the form of a nut which is engageable with the external screwthread and has oblique faces co-operating with the clamping jaws engaging the inner tube beyond the outer tube, this construction being improved in that the locking sleeve is provided with oblique faces at the end of the external screwthread remote from the clamping jaws and the nut is provided with appropriate corresponding oblique faces. The oblique faces of the locking sleeve at the end of the external screwthread remote from the clamping jaws may be formed by an annular bead.

In a preferred embodiment of the telescopically adjustable support according to the invention, the push-in end of the inner tube may be provided with an annular shoulder which abuts the projections when the inner tube is fully extended in relation to the outer tube.

It may be mentioned that, by reason of the better hold provided for the inner tube by the support of the invention, the wall thickness of the tubes may be less than in the case of known supports. Satisfactory results were obtainable with a wall thickness of 0.7 mm compared with 1.2 mm as generally used in known supports.

Further advantages, details and features of the invention will become evident from the following description of a preferred example with reference to the accompanying drawing, wherein:

BRIEF DESCRIPTION OF THE DRAWING

FIG. 1 is a plan view of a telescopically adjustable support according to the invention partially sectioned on the line I—I in FIG. 2;

FIG. 2 is a cross-section of the support on the line II—II in FIG. 1;

FIG. 3 is a longitudinal section of the locking sleeve on the line III—III in FIGS. 4 and 5;

FIG. 4 is an end elevation of the FIG. 3 locking sleeve;

FIG. 5 is a plan view of the FIG. 3 locking sleeve;

FIG. 6 is a partial longitudinal section of the nut for the support according to the invention, and FIG. 7 is an elevation of the push-on end of the outer tube detached from the push-in end of the inner tube of the support according to the invention, the locking sleeve and nut being omitted.

FIG. 8 is a partial segment, in elevation and enlarged form, showing the oblique surface 40.

DESCRIPTION OF THE PREFERRED EMBODIMENT(S)

The telescopically adjustable support shown in the drawing may be the telescopic leg of a camera tripod and generally comprises a plurality of intertelescoped tubes, of which only two tubes are shown in the drawing. As is particularly clear from FIG. 7, the respective outer tube 10 is provided at its push-on end which engages over the respective inner tube 12 with a plurality of apertures 14 spaced from the end of the tube. At its push-in end which is insertable in the outer tube 10, the inner tube 12 is provided with an annular shoulder 16. At the end of the inner tube 12 opposite the annular shoulder 16 there are again apertures 14 if a further inner tube is to be provided, in which case the tube 12 will constitute an outer tube for the further inner tube. A one-piece locking sleeve 18 is provided with an axially throughgoing slit 20 as is shown for example in FIG. 4. The locking sleeve 18 is sub-divided into two sections by an annular groove 22, one of the sections having an external screwthread 24 and the other section being sub-divided into three clamping jaws 28 by two further longitudinal slits 26 (see FIGS. 3 and 4) which extend substantially up to the annular shoulder 22. The three clamping jaws 28 which are each disposed between the slits 20, 26 can be sub-divided once again by a groove 30 on the inside (see FIG. 3). This ensures a high degree of flexibility in the radial direction of the clamping means defined by the clamping jaws 28. As will be evident from FIGS. 1 and 3, the internal periphery of the locking sleeve 18 is stepped, the section of the locking sleeve 18 associated with the external screwthread 24 having a larger internal diameter than the section of the locking sleeve associated with the clamping jaws 28. The larger internal diameter is adapted to the external diameter of the outer tube 10 whereas the smaller internal diameter is adapted to the external diameter of the inner tube 12. The inner face of the section of the locking sleeve having the larger internal diameter is provided with projections 32 for passing through the circumferentially uniformly distributed apertures 14 in the outer tube 10, as is shown in FIGS. 1 and 2. The radial length of the projections 32 is slightly larger than the radial spacing between the external surfaces of the outer tube 10 and the inner tube 12 inserted therein. Further, at the end of the external screwthread 24 of the locking sleeve 18 remote from the clamping jaws 28, there is an external annular bead 34 substantially at the same position as the projections 32. The bead 34 is slightly higher than the external screwthread 24.

A nut 36 which can be screwed over the locking sleeve 18 and has substantially the ame length as the locking sleeve 18 comprises an internal screwthread 38 co-operating with the external screwthread 24 of the locking sleeve. One end of the screwthread 38 adjoins an annular oblique face 40 for co-operating with the annular bead 34 of the locking sleeve and the other end adjoins an annular stepped oblique face 42 for co-operating with the stepped oblique face 44 of the clamping jaws 28. On the outside, the nut 36 is provided with longitudinal ribs 46 which ensure a secure grip when the nut is manually screwed onto the locking sleeve 18.

The tubes 10 and 12 are of metal and have a wall thickness of about 0.7 mm. The locking sleeve 18 and the nut 36 are of plastics material.

During assembly, the inner tube 12 with annular shoulder 16 is first inserted in the end of the outer tube 10 having the apertures 14, whereupon the locking sleeve 18, which can be readily expanded by reason of the throughgoing slit 20, is pushed over the inner tube onto the outer tube with the projections 32 directed forwardly, until the projections 32 engage through the apertures 14 in the outer tube 10. The annular shoulder 16 of the inner tube 12 is thereby disposed in front of the projections 32 as viewed in the withdrawal position of the inner tube, so that unintentional complete withdrawal of the inner tube 12 from the outer tube 10 is now prevented. Thereafter, the nut 36 is moved over the inner tube 12 and screwed onto the locking sleeve 18. The nut 36 can now be tightened with the inner tube 12 inserted in the outer tube 10 to any desired extent. During tightening, the annular stepped oblique face 42 of the nut 36 co-operates with the annular stepped oblique face 44 of the clamping jaws 28 to press the latter against the outer surface of the inner tube 12 and the annular oblique face 40 of the nut 38 co-operates with the annular bead 34 of the locking sleeve 18 to push the projections 32 likewise against the outer surface of the inner tube 12. In this way, the inner tube is fixed at two positions which are spaced apart as far as possible so that the inner tube 12 is securely held to the outer tube 10 against wobble.

It is expressly pointed out that in order to fix the inner tube there need be no axial engagement between the outer and inner tubes and therefore an axial clamping motion can be dispensed with and, in an alternative embodiment to that illustrated, the nut 36 can be dispensed with with simultaneous omission of the external screwthread 24 and the annular bead 34 of the locking sleeve to be replaced by a toggle clamp which is effective only in the radial direction. Since a screwing motion is then omitted, it is basically possible to use the one-piece locking sleeve for locating non-circular sections.

I claim:

1. A telescopically adjustable support, particularly for a camera tripod, comprising at least two telescopically engageable tubes of which the outer tube has circumferentially disposed apertures at the push-on end engaging over the inner tube, axially divided elastic locking means which are provided on the push-on end of the outer tube, extend over the zone of engagement of the inner and outer tubes to surround same and have projections engaging through the apertures of the outer tube as well as clamping means for engaging the inner tube beyond the outer tube, and fixing means cooperating with the locking means and acting on the clamping means thereof, characterized in that the locking means comprise a single one-piece locking sleeve having the projections that engage through the apertures in the outer tube and having the clamping means, and that, for additionally clamping the inner tube with the aid of the projections, the radial length of the projections of the sleeve engaging through the apertures in the outer tube is larger than the radial spacing between the external surfaces of the inner and outer tubes, thus a zone free of clamping being provided between the clamping means and the projections of the sleeve.

2. The support of claim 1, wherein the clamping means of the locking sleeve comprise a plurality of clamping jaws formed by axial slits at several positions in the section of the locking sleeve surrounding the inner tube beyond the outer tube.

3. The support of claim 1, wherein the part of the locking means having the projections and enveloping the outer tube is provided with an external screwthread and the fixing means are in the form of a nut which is engageable with the external screwthread and has oblique faces co-operating with the clamping means engaging the inner tube beyond the outer tube, and wherein the locking sleeve at the end of the external screwthread remote from the clamping means co-operates with the nut by way of an oblique surface arrangement to press the projections against the inner tube.

4. A telescopically adjustable support, particularly for a camera tripod, comprising at least two telescopically engageable tubes of which the outer tube has circumferentially disposed apertures at the push-on end engaging over the inner tube, axially divided elastic locking means which are provided on the push-on end of the outer tube, extend over the zone of engagement of the inner and outer tubes to surround same and have projections engaging through the apertures of the outer tube as well as clamping means for engaging the inner tube beyond the outer tube, and fixing means cooperating with the locking means and acting on the clamping means thereof, characterized in that the locking means comprise a single one-piece locking sleeve having both the projections that engage through the apertures in the outer tube and also having the clamping means, and that, for additionally clamping the inner tube with the aid of the projections, the radial length of the projections of the sleeve engaging through the apertures in the outer tube is larger than the radial spacing between the external surfaces of the inner and outer tubes, the part of the locking means having the projections and enveloping the outer tube is provided with an external screwthread and the fixing means are in the form of a nut which is engageable with the external screwthread and has oblique faces cooperating with the clamping means engaging the inner tube beyond the outer tube, and wherein the locking sleeve at the end of the external screwthread remote from the clamping means cooperates with the nut by way of an oblique surface arrangement to press the projections against the inner tube, and an annular bead is provided at the end of the external screwthread of the locking sleeve that is remote from the clamping means.

5. A telescopically adjustable support, particularly for a camera tripod, comprising at least two telescopically engageable tubes of which the outer tube has circumferentially disposed apertures at at the push-on end engaging over the inner tube, axially divided elastic locking means which are provided on the push-on end of the outer tube, extend over the zone of engagement of the inner and outer tubes to surround same and have projections engaging through the apertures of the outer tube as well as the clamping means for engaging the inner tube beyond the outer tube, and fixing means cooperating with the locking means and acting on the clamping means threof, characterized in that the locking means comprise a single one-piece locking sleeve having both the projections that engage through the apertures in the outer tube and also having the clamping means, and that, for additionally clamping the inner tube with the aid of the projections, the radial length of the projections of the sleeve engaging through the apertures in the outer tube is larger than the radial spacing between the external surfaces of the inner and outer tubes, and an annular groove is provided between the clamping means and the section of the locking sleeve that comes to lie on the outer tube.

6. A telescopically adjustable support, particularly for a camera tripod, comprising at least two telescopically engageable tubes of which the outer tube has circumferentially disposed apertures at the push-on end engaging over the inner tube, axially divided elastic locking means which are provided on the push-on end of the outer tube, extend over the zone of engagement of the inner and outer tubes to surround same and have projections engaging through the apertures of the outer tube as well as clamping means for engaging the inner tube beyond the outer tube, and fixing means co-operating with the locking means and acting on the clamping means thereof, characterized in that the locking means comprise a single one-piece locking sleeve having both the projections that engage through the apertures in the outer tube and also having the clamping means, and that, for additionally clamping the inner tube with the aid of the projections, the radial length of the projections of the sleeve engaging through the apertures in the outer tube is larger than the radial spacing between the external surfaces of the inner and outer tubes, the clamping means have longitudinal grooves on the inside.

* * * * *